United States Patent
Cao

(10) Patent No.: US 12,316,559 B2
(45) Date of Patent: May 27, 2025

(54) ELECTRONIC DEVICE AND METHOD FOR WIRELESS COMMUNICATION, AND COMPUTER-READABLE STORAGE MEDIUM

(71) Applicant: Sony Group Corporation, Tokyo (JP)

(72) Inventor: Jianfei Cao, Beijing (CN)

(73) Assignee: SONY GROUP CORPORATION, Tokyo (JP)

( * ) Notice: Subject to any disclaimer, the term of this patent is extended or adjusted under 35 U.S.C. 154(b) by 665 days.

(21) Appl. No.: 17/639,915

(22) PCT Filed: Oct. 9, 2020

(86) PCT No.: PCT/CN2020/119920
§ 371 (c)(1),
(2) Date: Mar. 3, 2022

(87) PCT Pub. No.: WO2021/068880
PCT Pub. Date: Apr. 15, 2021

(65) Prior Publication Data
US 2022/0337364 A1 Oct. 20, 2022

(30) Foreign Application Priority Data
Oct. 12, 2019 (CN) .......................... 201910967995.1

(51) Int. Cl.
*H04L 5/00* (2006.01)
(52) U.S. Cl.
CPC .................................. *H04L 5/0048* (2013.01)
(58) Field of Classification Search
CPC ........ H04W 52/04–52/242; H04L 5/48; H04L 5/0005; H04L 5/0051; H04L 5/0053
See application file for complete search history.

(56) References Cited

U.S. PATENT DOCUMENTS

2019/0281588 A1   9/2019  Zhang
2020/0351046 A1* 11/2020  Zhou ................... H04W 52/242
(Continued)

FOREIGN PATENT DOCUMENTS

| CN | 107734624 A | 2/2018 |
| CN | 108365939 A | 8/2018 |
| CN | 110536440 A | 12/2019 |

OTHER PUBLICATIONS

International Search Report and Written Opinion mailed on Jan. 7, 2021, received for PCT Application PCT/CN2020/119920, Filed on Oct. 9, 2020, 10 pages including English Translation.
(Continued)

*Primary Examiner* — Michael Thier
*Assistant Examiner* — Prince A Mensah
(74) *Attorney, Agent, or Firm* — XSENSUS LLP

(57) ABSTRACT

Provided are an electronic device and method for wireless communication, and a computer-readable storage medium. The electronic device comprises: a processing circuit configured to: determine a first aperiodic sounding reference signal resource, the beam transmission direction of which is updated by first MAC CE signaling; and re-determine a path loss reference signal for the first aperiodic sounding reference signal resource on the basis of beam transmission direction information of the first aperiodic sounding reference signal resource in the first MAC CE signaling, or second MAC CE signaling.

17 Claims, 10 Drawing Sheets

(56) References Cited

U.S. PATENT DOCUMENTS

2021/0120500 A1* 4/2021 Zhou .................... H04B 17/309
2022/0225242 A1* 7/2022 Guan .................... H04W 52/54
2022/0408371 A1* 12/2022 Matsumura ......... H04W 52/242

OTHER PUBLICATIONS

Huawei et al., "Enhancements on Multi-beam Operation", 3GPP TSG RAN WG1 Meeting #98bis, R1-1910074, Oct. 14-20, 2019, 18 pages.
LG Electronics, "Feature Lead Summary of Enhancements on Multi-beam Operations", 3GPP TSG RAN WG1 Meeting #96bis, R1-1905627, Apr. 8-12, 2019, 23 pages.
OPPO:"Discussion on Multi-beam Operation Enhancements", 3GPP Draft; RI-1910117, 3rd Generation Partnership Project (3GPP), Mobile Competence Centre; 650, Route Des Lucioles; F-06921 Sophia-Antipolis Cedex; France, vol. RAN WGI, no. Chongqing, China; Oct. 14, 2019-Oct. 20, 2019 Oct. 4, 2019 (Oct. 4, 2019), XP051808071, Retrieved from the Internet: URL: https://ftp.3gpp.org/tsg_ran/WG1_RL1/TSGR1_98b/Docs/RI-1910117.zip [retrieved on Oct. 4, 2019] * sections 1 and 2 *.
SONY:"Enhancements on multi-beam operation", 3GPP Draft; R1-1910750_Enhancements on Multi-Beam Operation, 3rd Generation Partnership Project (3GPP). Mobile Competence Centre; 650, Route Des Lucioles; F-06921 Sophia-Antipolis Cedex: France vol. RAN WGI, no. Chongqing, China; Oct. 14, 2019-Oct. 20, 2019 Oct. 4, 2019 (Oct. 4, 2019), XP051789539, Retrieved from the Internet: URL: http://www.3gpp.org/ftp/tsg_ran/WG1_RL1/TSGR1_98b/Docs/RI-1910750.zip[retrieved on Oct. 4, 2019] * section 2.1 *.

* cited by examiner

ELECTRONIC DEVICE AND METHOD FOR WIRELESS COMMUNICATION, AND COMPUTER-READABLE STORAGE MEDIUM

CROSS-REFERENCE TO RELATED APPLICATIONS

The present application is based on filing PCT/CN2020/119920, filed Oct. 9, 2020, and claims priority to Chinese Patent Application No. 201910967995.1, titled "ELECTRONIC DEVICE AND METHOD FOR WIRELESS COMMUNICATION, AND COMPUTER-READABLE STORAGE MEDIUM", filed on Oct. 12, 2019 with the China National Intellectual Property Administration (CNIPA), each of which is incorporated herein by reference in its entirety.

FIELD

The present disclosure relates to the technical field of wireless communications, and in particular to resource allocation of a Sounding Reference Signal (SRS) in a wireless communication system. More particularly, the present disclosure relates to an electronic apparatus and a method for wireless communications and a computer-readable storage medium.

BACKGROUND

In the standardization of 3GPP Rel.16, a beam emitting direction for an aperiodic SRS is configured through a radio resource control (RRC) signaling. In order to increase the flexibility of configuring the beam emitting direction for the signal, the beam emitting direction may be updated for a single aperiodic SRS resource through an MAC CE signaling.

In addition, a base station may configure multiple SRS resource sets for user equipment (UE). Each SRS resource set may include multiple SRS resources and uplink power control parameters for these SRS resources.

SUMMARY

In the following, an overview of the present disclosure is given simply to provide basic understanding to some aspects of the present disclosure. It should be understood that this overview is not an exhaustive overview of the present disclosure. It is not intended to determine a critical part or an important part of the present disclosure, nor to limit the scope of the present disclosure. An object of the overview is only to give some concepts in a simplified manner, which serves as a preface of a more detailed description described later.

An electronic apparatus for wireless communications is provided according to an aspect of the present disclosure. The electronic apparatus includes processing circuitry. The processing circuitry is configured to: determine a first aperiodic SRS resource whose beam emitting direction is updated by a first MAC CE signaling; and re-determine, based on information of the beam emitting direction of the first aperiodic SRS resource in the first MAC CE signaling or a second MAC CE signaling, a path loss reference signal (PL RS) for the first aperiodic SRS resource.

A method for wireless communications is provided according to another aspect of the present disclosure. The method includes: determining a first aperiodic SRS resource whose beam emitting direction is updated by a first MAC CE signaling; and re-determining, based on information of the beam emitting direction of the first aperiodic SRS resource in the first MAC CE signaling or a second MAC CE signaling, a PL RS for the first aperiodic SRS resource.

An electronic apparatus for wireless communications is provided according to an aspect of the present disclosure. The electronic apparatus includes processing circuitry. The processing circuitry is configured to: with respect to a first aperiodic SRS resource whose beam emitting direction is updated by a first MAC CE signaling, determine a method for user equipment to re-determine a PL RS for the first aperiodic SRS resource; and determine, based on the determined method, operations to be further performed.

A method for wireless communications is provided according to another aspect of the present disclosure. The method includes: with respect to a first aperiodic SRS resource whose beam emitting direction is updated by a first MAC CE signaling, determining a method for user equipment to re-determine a PL RS for the first aperiodic SRS resource; and determining, based on the determined method, operations to be further performed.

According to other aspects of the present disclosure, there are further provided computer program codes and computer program products for implementing the methods for wireless communications above, and a computer readable storage medium having recorded thereon the computer program codes for implementing the methods for wireless communications described above.

With the electronic apparatus and the method according to the embodiments of the present disclosure, the PL RS for the first aperiodic SRS resource whose beam emitting direction is updated by the first MAC CE signaling is updated, a proper PL RS can be configured for the first aperiodic SRS resource, thereby accurately determining the uplink emission power for the SRS.

These and other advantages of the present disclosure will be more apparent by illustrating in detail a preferred embodiment of the present disclosure in conjunction with accompanying drawings below.

BRIEF DESCRIPTION OF THE DRAWINGS

To further set forth the above and other advantages and features of the present disclosure, detailed description will be made in the following taken in conjunction with accompanying drawings in which identical or like reference signs designate identical or like components. The accompanying drawings, together with the detailed description below, are incorporated into and form a part of the specification. It should be noted that the accompanying drawings only illustrate, by way of example, typical embodiments of the present disclosure and should not be construed as a limitation to the scope of the disclosure. In the accompanying drawings.

DETAILED DESCRIPTION OF EMBODIMENTS

An exemplary embodiment of the present disclosure will be described hereinafter in conjunction with the accompanying drawings. For the purpose of conciseness and clarity, not all features of an embodiment are described in this specification. However, it should be understood that multiple decisions specific to the embodiment have to be made in a process of developing any such embodiment to realize a particular object of a developer, for example, conforming to those constraints related to a system and a business, and these constraints may change as the embodiments differs. Furthermore, it should also be understood that although the development work may be very complicated and time-consuming, for those skilled in the art benefiting from the present disclosure, such development work is only a routine task.

Here, it should also be noted that in order to avoid obscuring the present disclosure due to unnecessary details, only a device structure and/or processing steps closely related to the solution according to the present disclosure are illustrated in the accompanying drawing, and other details having little relationship to the present disclosure are omitted.

As described above, a beam emitting direction of a certain aperiodic SRS resource may be updated through an MAC CE signaling. Information of the beam emitting direction is with respect to a single aperiodic SRS resource. For example, the information includes Spatial Relation or Spatial Relation Info, which includes information of a downlink reference signal, such as a Channel State Information Reference Signal (CSI-RS) or an identifier (ID) of a synchronization signal block (SSB), or information of an uplink reference signal, such as an ID of another SRS resource.

In addition, uplink power control parameters for the SRS resource, such as pathlossReferenceRS, alpha, and p0 are configured in a unit of a SRS resource set. For example, pathlossReferenceRS indicates a periodic downlink reference signal, such as a periodic CSI-RSS or an SSB. The UE measures receiving power of the pathlossReferenceRS, that is, reference signal receiving power (RSRP), and the UE knows transmitting power of the pathlossReferenceRS (referred to as "PL RS" hereinafter), so that an uplink path loss and a downlink path loss of a channel in the beam direction can be calculated. The path losses may be used for adjusting the uplink emitting power of the SRS.

Figure 1:
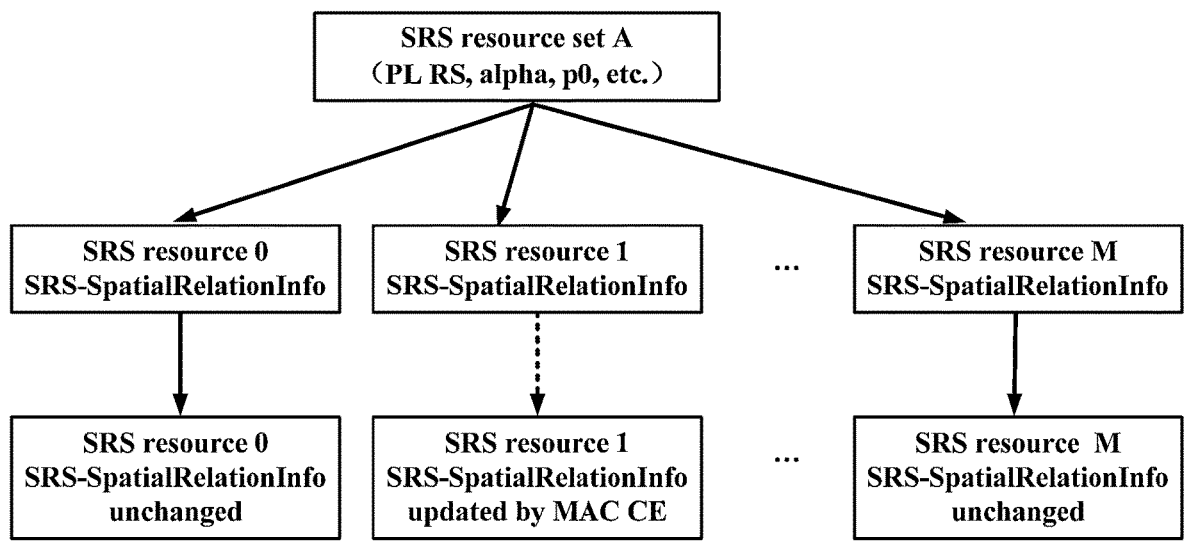
FIG. 1 shows a schematic example of updating a beam emitting direction of a aperiodic SRS resource in an SRS resource set by an MAC CE signaling.
Figure 2:
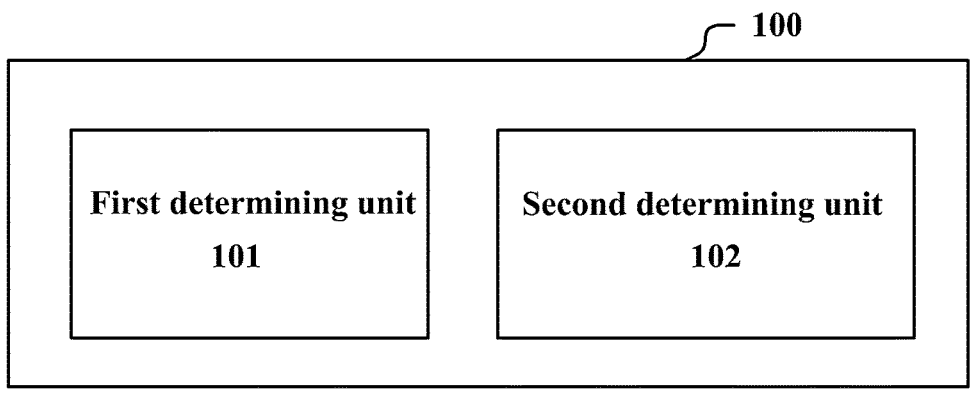
FIG. 2 is a block diagram showing functional modules of an electronic apparatus for wireless communications according to an embodiment of the present disclosure.

Therefore, in a case that a beam emitting direction of a aperiodic SRS resource is updated through MAC CE, a direction of a PL RS of an SRS resource set to which the aperiodic SRS resource belongs may have poor consistency with the updated beam emitting direction, for example, and thus it is no longer proper for the PL RS to serve as the PL RS for the aperiodic SRS resource. If the original PL RS is still used in this case, the uplink emitting power of the aperiodic SRS resource may not be adjusted correctly or accuracy of the adjustment may be poor. For ease of understanding, FIG. 1 shows a schematic example of updating a beam emitting direction of a aperiodic SRS resource in a SRS resource set by an MAC CE signaling. The SRS resource set A includes M SRS resources, and information of the beam emitting direction SRS-SpatialRelationInfo of the SRS resource 1 is updated by an MAC CE signaling. In this case, the PL RS for the SRS resource set A may no longer be suitable for the SRS resource 1. Examples of various methods for re-determining the PL RS for such aperiodic SRS resource are provided according to the embodiments.

First Embodiment

FIG. 1 is a block diagram showing functional modules of the electronic apparatus 100 for wireless communications according to an embodiment of the present disclosure. As shown in FIG. 1, the electronic apparatus 100 includes a first determining unit 101 and a second determining unit 102. The first determining unit 101 is configured to determine a first aperiodic SRS resource whose beam emitting direction is updated by a first MAC CE signaling. The second determining unit 102 is configured to re-determine, based on information of the beam emitting direction of the first aperiodic SRS resource in the first MAC CE signaling or a second MAC CE signaling, a PL RS for the first aperiodic SRS resource.

The first determining unit 101 and the first determining unit 102 may be implemented by one or more processing circuitries. The processing circuitry may be implemented as, for example, a chip or a processor. In addition, it should be understood that various functional units in the electronic apparatus shown in FIG. 1 are logical modules divided based on functions implemented by these functional units, and are not intended to limit specific implementations, which is applicable to examples of other electronic apparatuses described subsequently.

The electronic apparatus 100 may be arranged at a side of the UE or may be communicatively connected to the UE.

Here it should be pointed out that the electronic apparatus 100 may be implemented at a chip level or an apparatus level. For example, the electronic apparatus 100 may serve as the user equipment itself and further include external apparatuses such as a memory and a transceiver (which are not shown in the drawings). The memory may be configured to store programs to be executed and related data information required for the user equipment to implement various functions. The transceiver may include one or more communication interfaces to support communications with various apparatuses (for example, a base station, other user equipment and the like). Implementations of the transceiver are not limited herein.

In addition, ordinal numbers in the present disclosure such as the first and the second are only for distinguishing, and do not represent any temporal or spatial order or other meanings.

The UE, for example, receives the first MAC CE signaling from the base station. The first determining unit 101 determines that the first MAC CE signaling is to update the beam emitting direction of the first aperiodic SRS resource. The first MAC CE signaling includes information of the beam emitting direction of the first aperiodic SRS resource which is an updating target. As described above, the information of the beam emitting direction may include information of a downlink reference signal or information of an uplink reference signal.

In this embodiment, the second determining unit 102 may re-determine the PL RS of the first aperiodic SRS resource based on the information of the beam emitting direction in the first MAC CE signaling, and no additional signaling is required in this manner. Alternatively, the second determining unit 102 may re-determine the PL RS of the first aperiodic SRS resource based on a second MAC CE signaling transmitted by the base station. It should be noted that although the first MAC CE signaling and the second MAC CE signaling are described herein, it is not restrictive. The first MAC CE signaling and the second MAC CE signaling may be the same MAC CE signaling.

In an example, the second determining unit 102 is configured to re-determine the PL RS based on information of the downlink reference signal or the uplink reference signal included in the information of the beam emitting direction.

Figure 3:
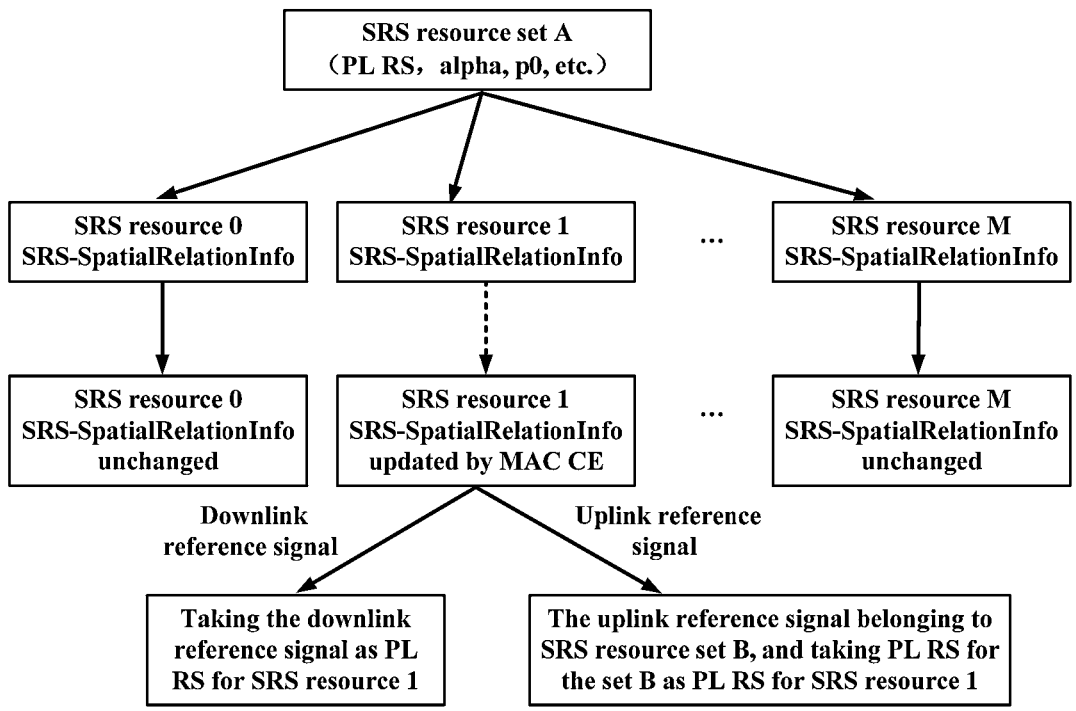
FIG. 3 schematically shows an example of a method for re-determining a PL RS for a first aperiodic SRS resource.

For example, in a case that the information of the beam emitting direction includes the information of the downlink reference signal, such as an ID of the downlink reference signal, the second determining unit 102 is configured to take the downlink reference signal as the PL RS for the first aperiodic SRS resource. The downlink reference signal is, for example, a CSI-RS or an SSB. The PL RS set in this way has good direction consistency with the first aperiodic SRS resource. On the other hand, in a case that the information of the beam emitting direction includes the information of the uplink reference signal, such as an ID of another SRS, the second determining unit 102 is configured to take the PL RS of an SRS resource set to which the uplink reference signal belongs as the PL RS for the first aperiodic SRS resource. A schematic diagram of this example is shown in FIG. 3, in which the first MAC CE updates the beam emitting direction of the SRS resource 1.

Figure 4:
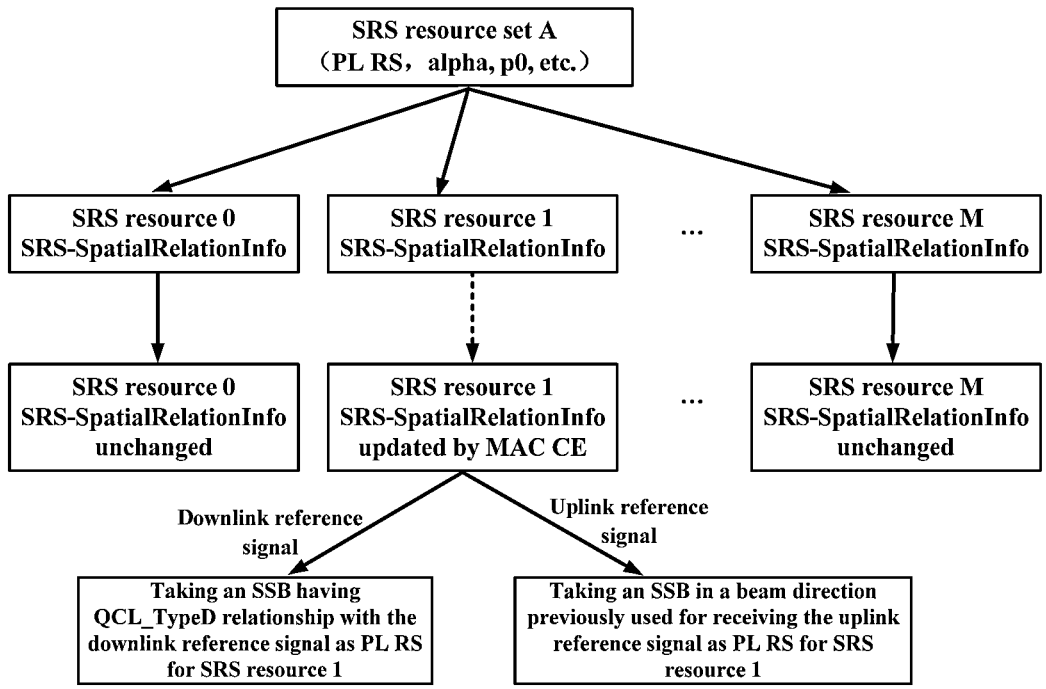
FIG. 4 schematically shows another example of a method for re-determining the PL RS for the first aperiodic SRS resource.

In addition, in a case that the information of the beam emitting direction includes the information of the downlink reference signal, such as the ID of the downlink reference signal, the second determining unit 102 may further be configured to take an SSB having QCL_TypeD relationship with the downlink reference signal as the PL RS of the first aperiodic SRS resource. On the other hand, in a case that the information of the beam emitting direction includes the information of the uplink reference signal, such as the ID of another SRS, the second determining unit 102 may further be configured to take an SSB in a beam direction previously used for receiving the uplink reference signal as the PL RS for the first aperiodic SRS resource. This manner may be referred to as a fall back manner, and a schematic diagram is shown in FIG. 4.

In this example, the second determining unit 102 may take the re-determined PL RS for the first aperiodic SRS resource as the PL RS for other aperiodic SRS resources in the first SRS resource set to which the first aperiodic SRS resource belongs, or may maintain the PL RS for other aperiodic SRS resources unchanged. For example, referring to FIGS. 3 and 4, the new PL RS for the SRS resource 1 may be taken as the PL RS for the SRS resource 0 and the SRS resource 2 to the SRS resource M. Alternatively, the PL RS for the SRS resource 0 and the SRS resource 2 to the SRS resource M may be maintained unchanged. M is a positive integer. The way to be adopted, for example, may be agreed in advance by the base station and the UE.

It can be seen that in this example, no additional signaling overhead is generated. The UE may determine the new PL RS for the first aperiodic SRS resource through the first MAC CE signaling itself.

In another example, the UE determines the new PL RS for the first aperiodic SRS resource with assistance of an additional MAC CE signaling from the base station.

Figure 5:
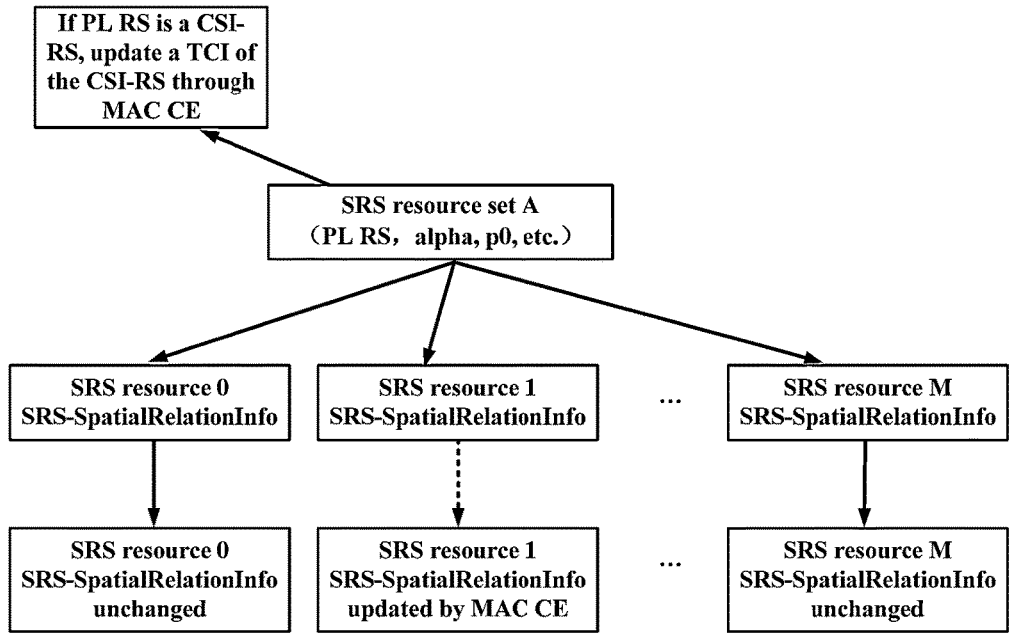
FIG. 5 schematically shows another example of a method for re-determining the PL RS for the first aperiodic SRS resource.

In a case that the PL RS for the first SRS resource set to which the first aperiodic SRS resource belongs is a CSI-RS, the second determining unit 102 is further configured to acquire a second MAC CE signaling from the base station and update a transmission configuration indication (TCI) of the PL RS for the first SRS resource set based on the second MAC CE signaling. Specifically, the second MAC CE signaling changes an emitting direction of the downlink beam of the CSI-RS by updating the TCI of the CSI-RS serving as the PL RS for the first SRS resource set, so as to indirectly change the PL RS for the first SRS resource set, so that the changed PL RS for the first SRS resource set is suitable for the first aperiodic SRS resource. A schematic diagram of this example is shown in FIG. 5, in which the first MAC CE updates the beam emitting direction of the SRS resource 1.

Similarly, the second determining unit 102 may apply the changed PL RS for the first SRS resource set to other aperiodic SRS resources in the set, or maintain the PL RS for the other aperiodic SRS resources unchanged. The configuration to be adopted, for example, depends on prior agreement between the base station and the UE.

Figure 6:
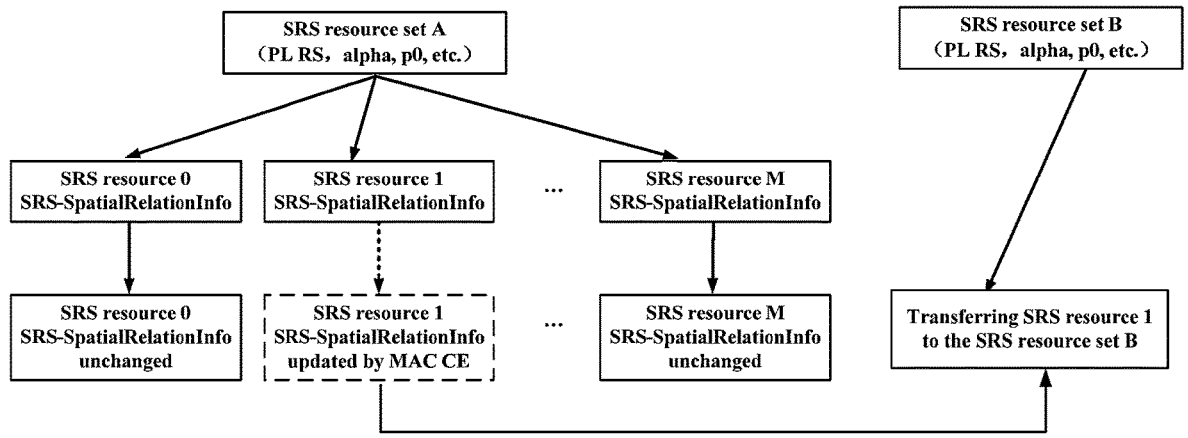
FIG. 6 schematically shows another example of a method for re-determining the PL RS for the first aperiodic SRS resource.

In another example, for example, the first aperiodic SRS resource belongs to the first SRS resource set, but a PL RS for a second SRS resource set which is different from the first SRS resource set is more suitable for the updated beam emitting direction of the first aperiodic SRS resource, so that it is more suitable for the PL RS for the second SRS resource set to serve as the PL RS for the first aperiodic SRS resource. In this case, the second determining unit 102 is further configured to acquire the second MAC CE signaling from the base station for transferring the first aperiodic SRS resource to the second SRS resource set. Accordingly, the second determining unit 102 determines the PL RS for the second SRS resource set as the PL RS for the first aperiodic SRS resource. A schematic diagram of this example is shown in FIG. 6.

In this example, by modifying the set belonging of the first aperiodic SRS resource, the PL RS for the first aperiodic SRS resource is updated while ensuring consistency of the PL RS within the SRS resource set.

In yet another example, for example, in a scenario of carrier aggregation (CA), an RRC signaling includes a parameter pathlossReferenceLinking, which is used for indicating to the UE a serving cell on which a PL RS for a certain SRS resource set is. Generally, the serving cell is one of a special cell (SpCell) and a secondary cell (SCell). There is only one SpCell, and there may be more than one SCell (for example, 31 at the most). In this example, a function of this parameter is extended. For example, a link for the PL RS for the first aperiodic SRS resource to another serving cell may be realized through the second MAC CE signaling. The second MAC CE signaling may include a SCell index for indicating a SCell to which the PL RS for the first aperiodic SRS resource is to be linked. Exemplarily, the PL RS for the first SRS resource set to which the first aperiodic SRS resource belongs is on the SpCell. However, after the beam emitting direction of the first aperiodic SRS resource is updated, the PL RS on the SpCell is no longer suitable for the first aperiodic SRS resource, and the base station will transmit the second MAC CE signaling to adjust the parameter pathlossReferenceLinking to a certain SCell. That is, the PL RS for the first aperiodic SRS resource is linked to another serving cell. It should be noted that the above adjustment is implemented through pathlossReferenceLinking. Therefore, it may be regarded that the PL RS for the first SRS resource set is linked to another serving cell. That is, the PL RS for all SRS resources in the first SRS resource set is linked to another serving cell. Alternatively, the PL RS for other SRS resources in the first SRS resource set may be maintained on the original serving cell. The way to be adopted, for example, may be agreed in advance by the base station and the UE.

Figure 7:
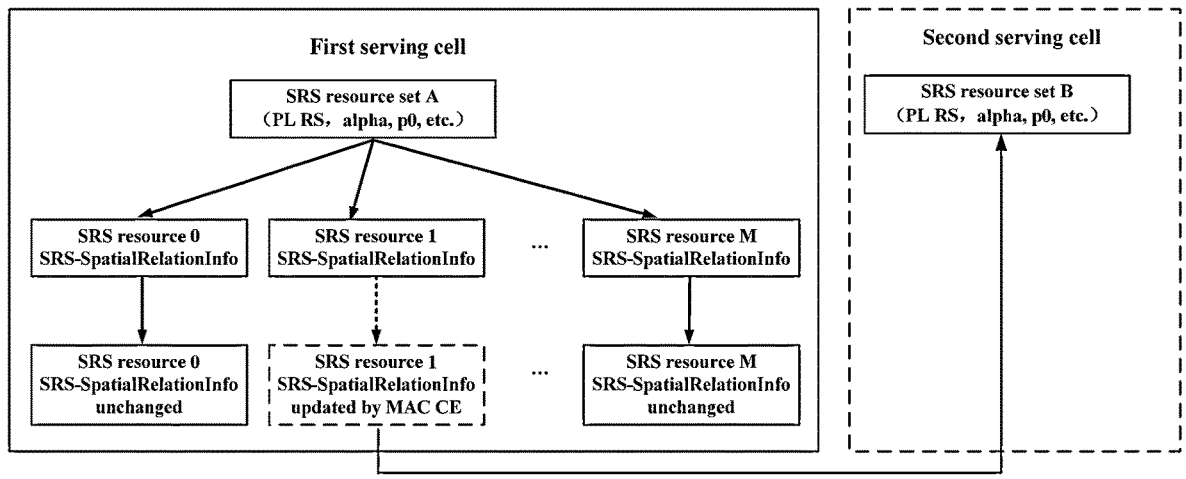
FIG. 7 schematically shows another example of a method for re-determining the PL RS for the first aperiodic SRS resource.

The first serving cell and the second serving cell are serving cells in carrier aggregation. The first aperiodic SRS resource belongs to the first SRS resource set, and the first PL RS for the first SRS resource set is on the first serving cell. The second MAC CE signaling is used for linking the first PL RS to the second serving cell. The first PL RS on the second serving cell is more suitable for the updated beam emitting direction of the first aperiodic SRS resource, so that it is more suitable for the first PL RS on the second serving cell to serve as the PL RS for the first aperiodic SRS resource. The second determining unit 102 determines the first PL RS on the second serving cell as the PL RS for the first aperiodic SRS resource. A schematic diagram of this example is shown in FIG. 7, in which the PL RS for the SRS resource 1 is linked to the second serving cell through the second MAC CE signaling. In the second serving cell, the PL RS is, for example, the PL RS for the SRS resource set B. Depending on the prior agreement between the base station and the UE, the PL RS for other SRS resources in the SRS resource set A may be linked to the second serving cell or remain unchanged.

Similarly, in this example, by modifying serving cell linking relationship of the PL RS for the first aperiodic SRS resource through the MAC CE signaling, the PL RS for the first aperiodic SRS resource is updated while using the existing signaling.

It should be noted that examples of various methods for re-determining the PL RS for the aperiodic SRS resource whose beam emitting direction is updated by the MAC CE signaling are described above, and the examples are not restrictive.

In addition, in a case that the PL RS for the first aperiodic SRS resource may be re-determined with various methods, different priority levels may be set for different methods. For example, the second determining unit 102 may select the method for re-determining the PL RS for the first aperiodic SRS resource according to the following priority order: determining based on the second MAC CE signaling, determining based on the information of the beam emitting direction. That is, in a case that there is the second MAC CE signaling, the PL RS for the first aperiodic SRS resource is determined according to indication of the second MAC CE signaling, otherwise the PL RS is determined based on the information of the beam emitting direction. It should be understood that this is not restrictive, and a reverse priority order may be adopted. Alternatively, the UE may determine a method to be adopted by itself.

On the other hand, the UE and the base station may agree to use a fixed method for determining the PL RS for the first aperiodic SRS resource. For example, one method is selected from among the above various methods, and the PL RS is determined only with the selected method. In this case, for example, a method with the minimum signaling overhead may be selected, such as a method of determining based on the information of the uplink reference signal or the downlink reference signal included in the information of the beam emitting direction.

In summary, the electronic apparatus 100 according to this embodiment updates the PL RS for the first aperiodic SRS resource whose beam emitting direction is updated by the first MAC CE signaling, and thus can configure a proper PL RS for the first aperiodic SRS resource, thereby accurately determining the uplink emission power of the SRS.

Second Embodiment

Figure 8:
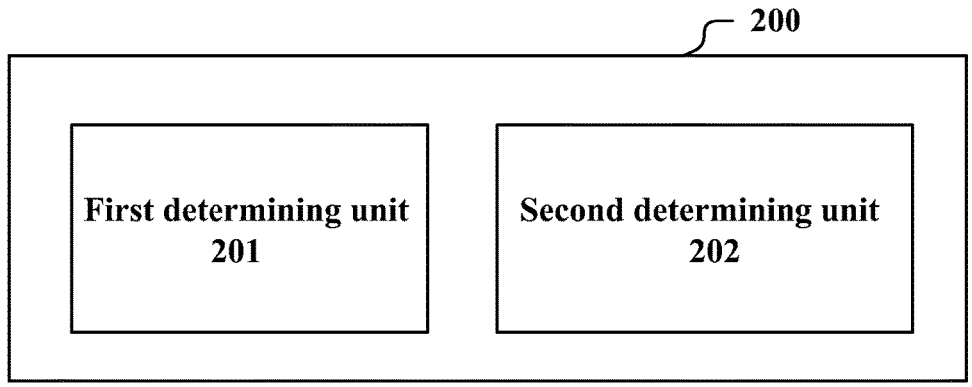
FIG. 8 is a block diagram showing functional modules of an electronic apparatus for wireless communications according to another embodiment of the present disclosure.

FIG. 8 is a block diagram showing functional modules of an electronic apparatus 200 according to another embodiment of the present disclosure. As shown in FIG. 8, the electronic apparatus 200 includes a first determining unit 201 and a second determining 202. The first determining unit 201 is configured to determine, with respect to a first aperiodic SRS resource whose beam emitting direction is updated by a first MAC CE signaling, a method for UE to re-determine a PL RS for the first aperiodic SRS resource. The second determining 202 is configured to determine, based on the determined method, operations to be further performed.

The first determining unit 201 and the second determining unit 202 may be implemented by one or more processing circuitries. The processing circuitry may be implemented as, for example, a chip or a processor. In addition, it should be understood that various functional units in the electronic apparatus shown in FIG. 8 are logical modules divided based on functions implemented by these functional units, and are not intended to limit specific implementations, which is also applicable to examples of other electronic apparatus to be described in the following.

The electronic apparatus 200, for example, may be arranged at a side of a base station or may be communicatively connected to a base station. The base station described in the present disclosure may be a transmit receive point (TRP) or an access point (AP). Here, it should be pointed out that the electronic apparatus 200 may be implemented at a chip level or an apparatus level. For example, the electronic apparatus 200 may serve as the base station itself and further include external apparatuses such as a memory and a transceiver (which are not shown in the drawings). The memory may be configured to store programs to be executed and related data information for the base station to implement various functions. The transceiver may include one or more communication interfaces to support communications with various apparatuses (for example, user equipment, another base station and the like). Implementations of the transceiver are not limited herein.

Similar to the first embodiment, the new PL RS for the first aperiodic SRS resource may be determined with various methods.

For example, the first determining unit 201 may determine to adopt the following method. The UE re-determines the PL RS based on the information of the uplink reference signal or the downlink reference signal included in the information of the beam direction. The method is described in detail in the first embodiment and is not repeated herein. With this method, the base station is not required to transmit any other signaling or perform other operations, so that the second determining unit 202 is configured to determine that no further operation is to be performed.

In another example, in a case that the PL RS for the first SRS resource set to which the first aperiodic SRS resource belongs is a CSI-RS, the first determining unit 201 may determine to adopt the following method: updating a TCI of the CSI-RS through the second MAC CE signaling, so that it is suitable for the CSI-RS to serve as the PL RS for the first aperiodic SRS resource. The second determining unit 202 is configured to generate a second MAC CE signaling including the TCI and transmit the second MAC CE signaling to the UE. Accordingly, the UE determines the CSI-RS with the updated TCI as the PL RS for the first aperiodic SRS resource according to the second MAC CE signaling. Optionally, the PL RS for other aperiodic SRS resources in the first SRS resource set may be maintained unchanged or changed to the new PL RS, which depends on, for example, a prior agreement between the base station and the UE. It can be seen that with this method, the base station is required to additionally generate and transmit the second MAC CE signaling.

In another example, assuming that the first aperiodic SRS resource belongs to the first SRS resource set, and the PL RS for the second SRS resource set which is different from the first SRS resource set is suitable to serve as the PL RS for the first aperiodic SRS resource, and the method determined by the first determining unit 202 may include: transferring the first aperiodic SRS resource to the second SRS resource set through the second MAC CE signaling. In this way, the UE may determine the PL RS for the second SRS resource set as the PL RS for the first aperiodic SRS resource. The second determining unit 202 is configured to generate the second MAC CE signaling and transmits the second MAC CE signaling to the UE.

In another example, it is assumed that in a CA scenario, and the first serving cell and the second serving cell are serving cells in carrier aggregation, and a parameter pathlossReferenceLinking in an RRC signaling indicates a cell on which the first PL RS for the first SRS resource set is, such as the first serving cell. The first aperiodic SRS resource belongs to the first SRS resource set. After the beam emitting direction of the first aperiodic SRS resource is updated through the first MAC CE signaling, the first PL RS on the first serving cell is no longer suitable to serve as the PL RS for the first aperiodic SRS resource. Meanwhile, the first PL RS, when being on the second serving cell, is suitable to serve as the PL RS for the first aperiodic SRS resource. In this case, the first determining unit 201 may determine that the following method is adopted: linking the first PL RS to the second serving cell through the second MAC CE signaling. In this way, the UE may determine the first PL RS on the second serving cell as the PL RS for the first aperiodic SRS resource. The second determining unit 202 is configured to generate the second MAC CE signaling and transmit the second MAC CE signaling to the UE. Optionally, the PL RS for other aperiodic SRS resources in the first SRS resource set may remain unchanged or may be linked to the second serving cell, which depends on, for example, a prior agreement between the base station and the UE.

For details of the above methods, one may refer to the description in the first embodiment, and the details are not repeated herein. It should be noted that, similar to the first embodiment, the first MAC CE signaling and the second MAC CE signaling may be the same MAC CE signaling.

As an implementation, the first determining unit 201 may determine to adopt one of the various methods based on various factors, and the second determining unit 202 may determine operations to be further performed based on the determined method. For example, the first determining unit 201 may determine the method based on one or more of: the information of the beam emitting direction in the first MAC CE signaling, the PL RS for each SRS resource set, and signaling overhead. For example, the first determining unit 201 may determine the priority order of the various methods based on one or more of these factors, and select a method with high priority.

As another implementation, the first determining unit 201 may fixedly adopt a certain method, and the second determining unit 202 determines operations to be further performed based on the method. For example, the method fixedly adopted has good universality and small signaling overhead. For example, the first determining unit 201 may fixedly adopt the method that the UE re-determines the PL RS based on the information of the uplink reference signal or the downlink reference signal included in the information of the beam direction. In this case, the first determining unit 201 and the second determining unit 201 may even be omitted and it is only required to make an agreement between the base station and the UE.

In summary, the electronic apparatus 200 according to this embodiment updates the PL RS for the first aperiodic SRS resource whose beam emitting direction is updated by the first MAC CE signaling, and thus can configure a proper PL RS for the first aperiodic SRS resource, thereby accurately determining the uplink emission power of the SRS.

Third Embodiment

In the above description of embodiments of the electronic apparatuses for wireless communications, it is apparent that some processing and methods are further disclosed. In the following, a summary of the methods are described without repeating details that are described above. However, it should be noted that although the methods are disclosed when describing the electronic apparatuses for wireless communications, the methods are unnecessary to adopt those components or to be performed by those components described above. For example, implementations of the electronic apparatuses for wireless communications may be partially or completely implemented by hardware and/or firmware. Methods for wireless communications to be discussed blow may be completely implemented by computer executable programs, although these methods may be implemented by the hardware and/or firmware for implementing the electronic apparatuses for wireless communications.

Figure 9:
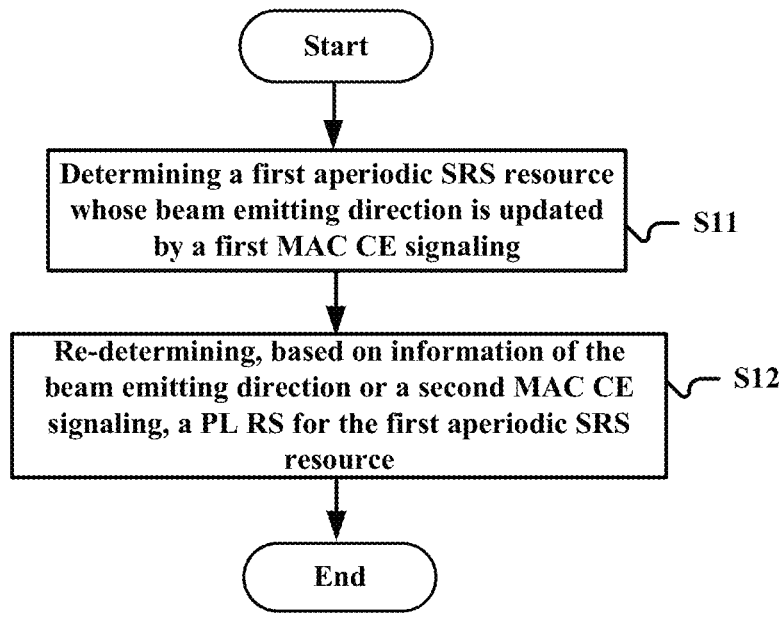
FIG. 9 is a flowchart of a method for wireless communications according to an embodiment of the present disclosure.

FIG. 9 is a flowchart of a method for wireless communications according to an embodiment of the present disclosure. The method includes: determining a first aperiodic SRS resource whose beam emitting direction is updated by a first MAC CE signaling (S11); and re-determining, based on information of the beam emitting direction of the first aperiodic SRS resource in the first MAC CE signaling or a second MAC CE signaling, a PL RS for the first aperiodic SRS resource (S12). The method may be performed on a UE side.

In an example, in step S12, the PL RS may be re-determined based on the information of the downlink reference signal or the uplink reference signal included in the information of the beam emitting direction. In a case that the information of the beam emitting direction includes the information of the downlink reference signal, the downlink reference signal may serve as the PL RS for the first aperiodic SRS resource. In a case that the information of the beam emitting direction includes the information of the uplink reference signal, the PL RS for the SRS resource set to which the uplink reference signal belongs may serve as the PL RS for the first aperiodic SRS resource. Alternatively, in a case that the information of the beam emitting direction includes the information of the downlink reference signal, an SSB having QCL_TypeD relationship with the downlink reference signal may serve as the PL RS for the first aperiodic SRS resource. In a case that the information of the beam emitting direction includes the information of the uplink reference signal, an SSB in a beam direction previously used for receiving the uplink reference signal can serve as the PL RS for the first aperiodic SRS resource.

In another example, in a case that the PL RS for the first SRS resource set to which the first aperiodic SRS resource belongs is CSI-RS, the step S12 includes: acquiring a second MAC CE signaling from the base station and updating the TCI of the PL RS for the first SRS resource set based on the second MAC CE signaling.

In another example, the first aperiodic SRS resource belongs to the first SRS resource set, and the second MAC CE signaling is used for transferring the first aperiodic SRS resource to the second SRS resource set which is different from the first SRS resource set. Step S12 further includes: determining the PL RS for the second SRS resource set as the PL RS for the first aperiodic SRS resource.

In another example, for the CA scenario, the first aperiodic SRS resource belongs to the first SRS resource set, and the first PL RS for the first SRS resource set is on the first serving cell. The second MAC CE signaling is used for linking the first PL RS to the second serving cell. Step S12 further includes: determining the first PL RS on the second serving cell as the PL RS for the first aperiodic SRS resource. The first serving cell and the second serving cell are serving cells in carrier aggregation.

In addition, depending on actual configuration, in some examples, the re-determined PL RS for the first aperiodic SRS resource may be taken as PL RS for other aperiodic SRS resources in the set to which the first aperiodic SRS resource belongs. Alternatively, the PL RS for other aperiodic SRS resources may remain unchanged.

In addition, in step S12, for example, the method for re-determining the PL RS for the first aperiodic SRS resource may be selected according to the following priority order: determining based on the second MAC CE signaling, determining based on the information of the beam emitting direction. It should be understood that the above description is not restrictive.

Figure 10:
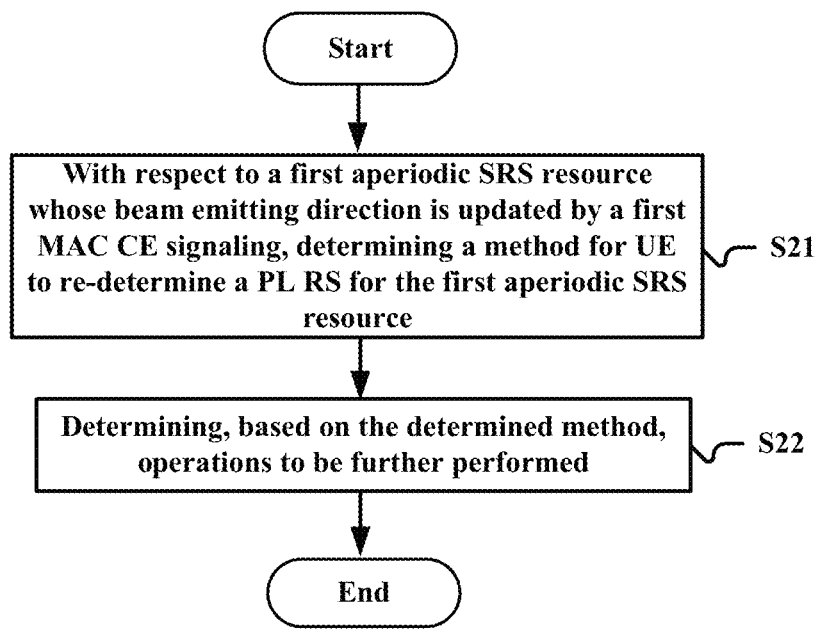
FIG. 10 is a flowchart of a method for wireless communications according to another embodiment of the present disclosure.

FIG. 10 is a flowchart of a method for wireless communications according to another embodiment of the present disclosure. The method includes: with respect to a first aperiodic SRS resource whose beam emitting direction is updated by a first MAC CE signaling, determining a method for user equipment to re-determine a PL RS for the first aperiodic SRS resource (S21); and determining, based on the determined method, operations to be further performed (S22). The method may be performed on a base station side, for example.

The method for UE to re-determine the PL RS for the first aperiodic SRS resource is described in detail above, and the method is not repeated herein.

In addition, in step S21, for example, the method may be determined based on one or more of: the information of the beam emitting direction in the first MAC CE signaling; the PL RS for each SRS resource set; and signaling overhead.

With the methods according to this embodiment of the present disclosure, the PL RS for the first aperiodic SRS resource whose beam emitting direction is updated by the first MAC CE signaling is updated, and a proper PL RS can be configured for the first aperiodic SRS resource, thereby accurately determining the uplink emission power of the SRS.

It should be noted that the above methods may be used separately or in combination. Details thereof are described in the first embodiment and the second embodiment, and are not repeated here.

The technology according to the present disclosure is applicable to various products.

For example, the electronic apparatus 200 may be implemented as various base stations. The base station may be implemented as any type of evolved node B (eNB) or gNB (5G base station). The eNB includes, for example, a macro eNB and a small eNB. The small eNB may be an eNB covering a cell smaller than a macro cell, such as a pico eNB, a micro eNB, and a home (femto) eNB. The case for the gNB is similar to the above. Alternatively, the base station may be implemented as any other type of base station, such as a NodeB and a base transceiver station (BTS). The base station may include: a main body (also referred to as a base station apparatus) configured to control wireless communication; and one or more remote wireless head ends (RRH) located at positions different from the main body. In addition, various types of user equipment may each serves as a base station by performing functions of the base station temporarily or semi-permanently.

The electronic apparatus 100 may be implemented as various user equipments. The user equipment may be implemented as a mobile terminal (such as a smartphone, a tablet personal computer (PC), a notebook PC, a portable game terminal, a portable/dongle mobile router, and a digital camera) or a vehicle terminal (such as a vehicle navigation apparatus). The user equipment may also be implemented as a terminal that performs machine-to-machine (M2M) communication (also referred to as a machine type communication (MTC) terminal). Furthermore, the user equipment may be a wireless communication module (such as an integrated circuitry module including a single die) mounted on each of the terminals described above.

Application Example Regarding a Base Station

First Application Example

Figure 11:
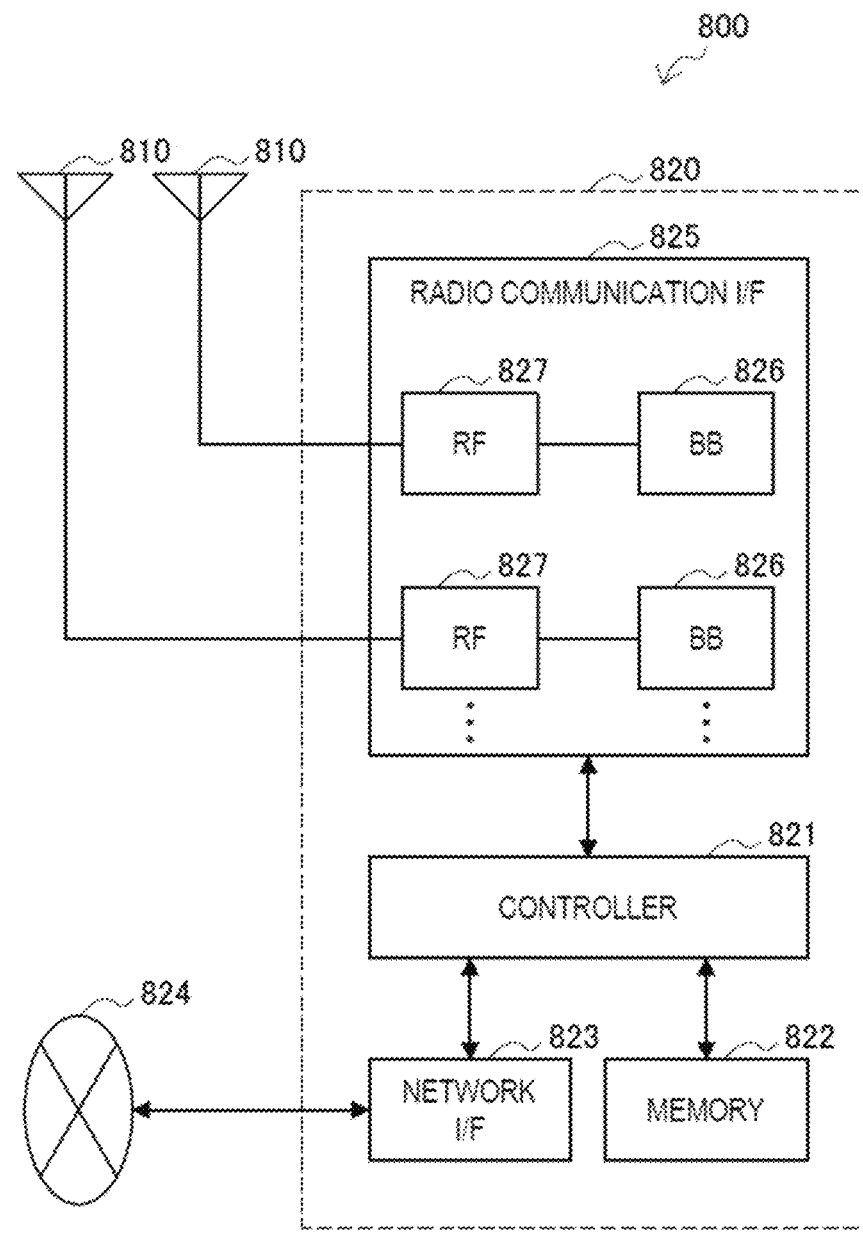
FIG. 11 is a block diagram showing a first example of an exemplary configuration of an eNB or gNB to which the technology according to the present disclosure may be applied.

FIG. 11 is a block diagram showing a first example of an exemplary configuration of an eNB or gNB to which technology according to the present disclosure may be applied. It should be noted that the following description is given by taking the eNB as an example, which is also applicable to the gNB. An eNB 800 includes one or more antennas 810 and a base station apparatus 820. The base station apparatus 820 and each of the antennas 810 may be connected to each other via a radio frequency (RF) cable.

Each of the antennas 810 includes a single or multiple antennal elements (such as multiple antenna elements included in a multiple-input multiple-output (MIMO) antenna), and is used for the base station apparatus 820 to transmit and receive wireless signals. As shown in FIG. 11, the eNB 800 may include the multiple antennas 810. For example, the multiple antennas 810 may be compatible with multiple frequency bands used by the eNB 800. Although FIG. 11 shows the example in which the eNB 800 includes the multiple antennas 810, the eNB 800 may also include a single antenna 810.

The base station apparatus 820 includes a controller 821, a memory 822, a network interface 823, and a radio communication interface 825.

The controller 821 may be, for example, a CPU or a DSP, and operates various functions of a higher layer of the base station apparatus 820. For example, the controller 821 generates a data packet from data in signals processed by the radio communication interface 825, and transfers the generated packet via the network interface 823. The controller 821 may bundle data from multiple base band processors to generate the bundled packet, and transfer the generated bundled packet. The controller 821 may have logical functions of performing control such as radio resource control, radio bearer control, mobility management, admission control and scheduling. The control may be performed in corporation with an eNB or a core network node in the vicinity. The memory 822 includes a RAM and a ROM, and stores a program executed by the controller 821 and various types of control data (such as terminal list, transmission power data and scheduling data).

The network interface 823 is a communication interface for connecting the base station apparatus 820 to a core network 824. The controller 821 may communicate with a core network node or another eNB via the network interface 823. In this case, the eNB 800, and the core network node or another eNB may be connected to each other via a logic interface (such as an S1 interface and an X2 interface). The network interface 823 may also be a wired communication interface or a wireless communication interface for wireless backhaul. If the network interface 823 is a wireless communication interface, the network interface 823 may use a higher frequency band for wireless communication than that used by the radio communication interface 825.

The radio communication interface 825 supports any cellular communication scheme (such as Long Term Evolution (LTE) and LTE-advanced), and provides wireless connection to a terminal located in a cell of the eNB 800 via the antenna 810. The radio communication interface 825 may typically include, for example, a baseband (BB) processor 826 and an RF circuit 827. The BB processor 826 may perform, for example, encoding/decoding, modulating/demodulating, and multiplexing/demultiplexing, and performs various types of signal processing of layers (such as L1, Media Access Control (MAC), Radio Link Control (RLC), and a Packet Data Convergence Protocol (PDCP)). The BB processor 826 may have a part or all of the above-described logical functions instead of the controller 821. The BB processor 826 may be a memory storing communication control programs, or a module including a processor and a related circuit configured to execute the programs. Updating the program may allow the functions of the BB processor 826 to be changed. The module may be a card or a blade that is inserted into a slot of the base station apparatus 820. Alternatively, the module may also be a chip that is mounted on the card or the blade. Meanwhile, the RF circuit 827 may include, for example, a mixer, a filter, and an amplifier, and transmits and receives wireless signals via the antenna 810.

As shown in FIG. 11, the radio communication interface 825 may include the multiple BB processors 826. For example, the multiple BB processors 826 may be compatible with multiple frequency bands used by the eNB 800. The radio communication interface 825 may include multiple RF circuits 827, as shown in FIG. 11. For example, the multiple RF circuits 827 may be compatible with multiple antenna elements. Although FIG. 11 shows the example in which the radio communication interface 825 includes the multiple BB processors 826 and the multiple RF circuits 827, the radio communication interface 825 may also include a single BB processor 826 and a single RF circuit 827.

In the eNB 800 shown in FIG. 11, a transceiver of the electronic apparatus 200 may be implemented by the radio communication interface 825. At least a part of functions may also be implemented by the controller 821. For example, the controller 821 may determine the method for the UE to re-determine the PL RS for the first aperiodic SRS resource whose beam emitting direction is updated by the MAC CE signaling and perform corresponding operations by performing functions of the first determining unit 201 and the second determining unit 202.

Second Application Example

Figure 12:
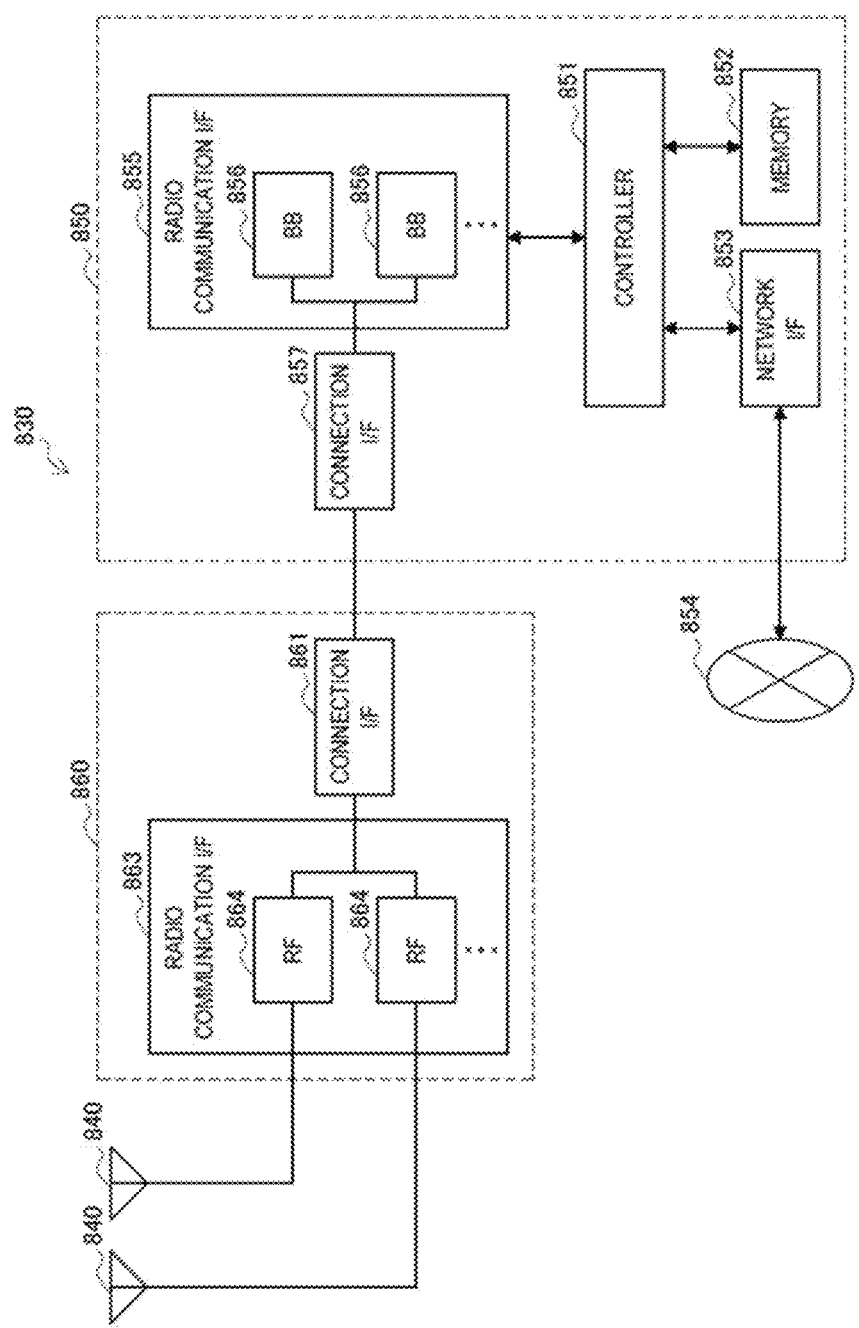
FIG. 12 is a block diagram showing a second example of an exemplary configuration of the eNB or gNB to which the technology according to the present disclosure may be applied.

FIG. 12 is a block diagram showing a second example of the exemplary configuration of an eNB or gNB to which the technology according to the present disclosure may be applied. It should be noted that the following description is given by taking the eNB as an example, which is also applied to the gNB. An eNB 830 includes one or more antennas 840, a base station apparatus 850, and an RRH 860. The RRH 860 and each of the antennas 840 may be connected to each other via an RF cable. The base station apparatus 850 and the RRH 860 may be connected to each other via a high speed line such as an optical fiber cable.

Each of the antennas 840 includes a single or multiple antennal elements (such as multiple antenna elements included in an MIMO antenna), and is used for the RRH 860 to transmit and receive wireless signals. As shown in FIG. 12, the eNB 830 may include the multiple antennas 840. For example, the multiple antennas 840 may be compatible with multiple frequency bands used by the eNB 830. Although FIG. 12 shows the example in which the eNB 830 includes the multiple antennas 840, the eNB 830 may also include a single antenna 840.

The base station apparatus 850 includes a controller 851, a memory 852, a network interface 853, a radio communication interface 855, and a connection interface 857. The controller 851, the memory 852, and the network interface 853 are the same as the controller 821, the memory 822, and the network interface 823 described with reference to FIG. 11.

The radio communication interface 855 supports any cellular communication scheme (such as LTE and LTE-advanced), and provides wireless communication to a terminal located in a sector corresponding to the RRH 860 via the RRH 860 and the antenna 840. The radio communication interface 855 may typically include, for example, a BB processor 856. The BB processor 856 is the same as the BB processor 826 described with reference to FIG. 11, except that the BB processor 856 is connected to an RF circuit 864 of the RRH 860 via the connection interface 857. As show in FIG. 12, the radio communication interface 855 may include the multiple BB processors 856. For example, the multiple BB processors 856 may be compatible with multiple frequency bands used by the eNB 830. Although FIG. 12 shows the example in which the radio communication interface 855 includes the multiple BB processors 856, the radio communication interface 855 may also include a single BB processor 856.

The connection interface 857 is an interface for connecting the base station apparatus 850 (radio communication interface 855) to the RRH 860. The connection interface 857 may also be a communication module for communication in the above-described high speed line that connects the base station apparatus 850 (radio communication interface 855) to the RRH 860.

The RRH 860 includes a connection interface 861 and a radio communication interface 863.

The connection interface 861 is an interface for connecting the RRH 860 (radio communication interface 863) to the base station apparatus 850. The connection interface 861 may also be a communication module for communication in the above-described high speed line.

The radio communication interface 863 transmits and receives wireless signals via the antenna 840. The radio communication interface 863 may typically include, for example, the RF circuit 864. The RF circuit 864 may include, for example, a mixer, a filter and an amplifier, and transmits and receives wireless signals via the antenna 840. The radio communication interface 863 may include multiple RF circuits 864, as shown in FIG. 12. For example, the multiple RF circuits 864 may support multiple antenna elements. Although FIG. 12 shows the example in which the radio communication interface 863 includes the multiple RF circuits 864, the radio communication interface 863 may also include a single RF circuit 864.

In the eNB 830 shown in FIG. 12, a transceiver of the electronic apparatus 200 may be implemented by the radio communication interface 855 and/or the radio communication interface 863. At least a part of functions may also be implemented by the controller 851. For example, the controller 851 may determine the method for the UE to re-determine the PL RS for the first aperiodic SRS resource whose beam emitting direction is updated by the MAC CE signaling and perform corresponding operations by performing functions of the first determining unit 201 and the second determining unit 202.

Application Example Regarding User Equipment

First Application Example

Figure 13:
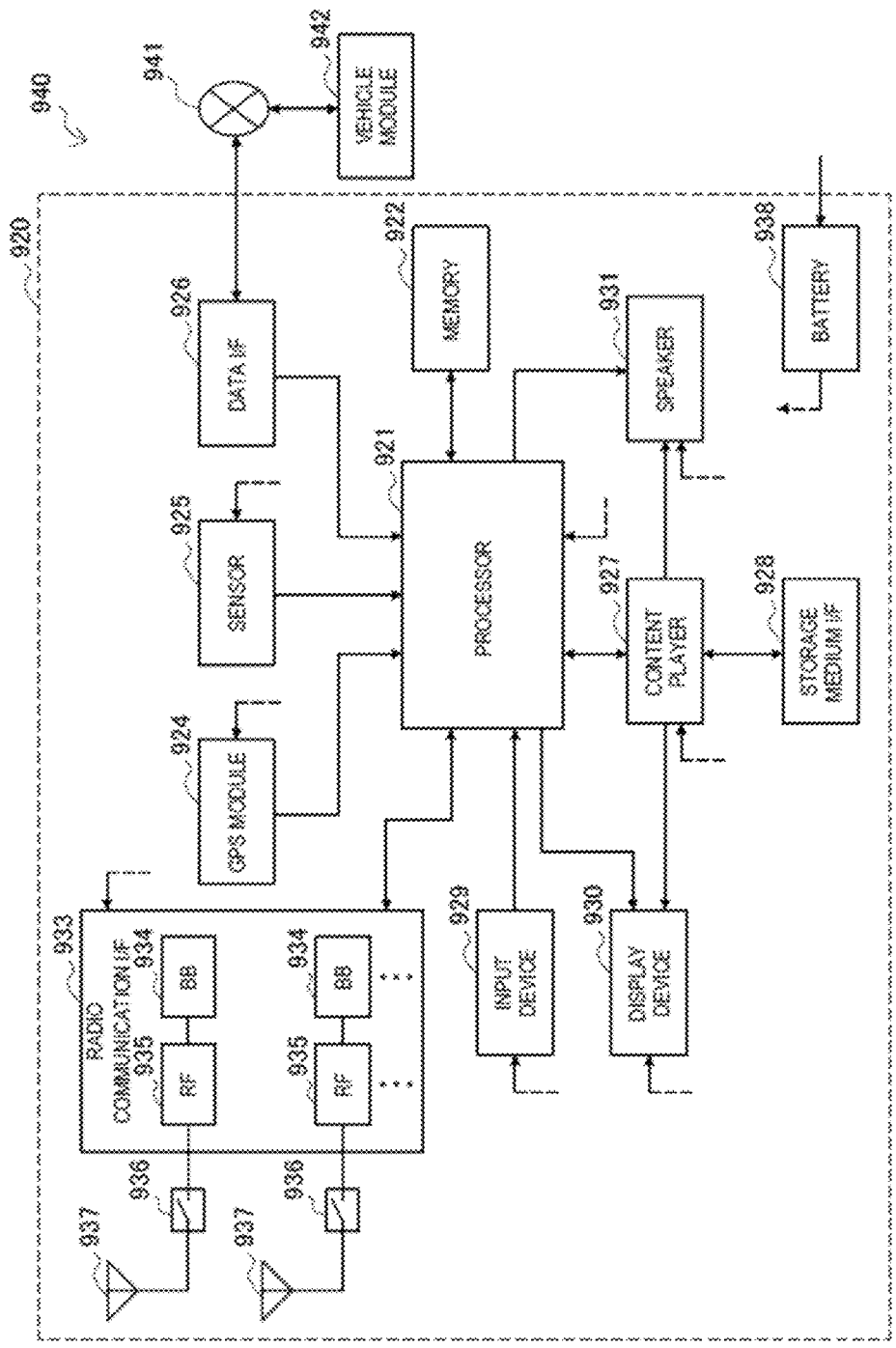
FIG. 13 is a block diagram showing an example of an exemplary configuration of a smartphone to which the technology according to the present disclosure may be applied.

FIG. 13 is a block diagram showing an exemplary configuration of a smartphone 900 to which the technology according to the present disclosure may be applied. The smartphone 900 includes a processor 901, a memory 902, a storage 903, an external connection interface 904, a camera 906, a sensor 907, a microphone 908, an input device 909, a display device 910, a speaker 911, a radio communication interface 912, one or more antenna switches 915, one or more antennas 916, a bus 917, a battery 918, and an auxiliary controller 919.

The processor 901 may be, for example, a CPU or a system on a chip (SoC), and controls functions of an application layer and another layer of the smartphone 900. The memory 902 includes a RAM and a ROM, and stores a program executed by the processor 901 and data. The storage 903 may include a storage medium such as a semiconductor memory and a hard disk. The external connection interface 904 is an interface for connecting an external device (such as a memory card and a universal serial bus (USB) device) to the smartphone 900.

The camera 906 includes an image sensor (such as a charge coupled device (CCD) and a complementary metal oxide semiconductor (CMOS)), and generates a captured image. The sensor 907 may include a group of sensors, such as a measurement sensor, a gyro sensor, a geomagnetism sensor, and an acceleration sensor. The microphone 908 converts sounds that are inputted to the smartphone 900 to audio signals. The input device 909 includes, for example, a touch sensor configured to detect touch onto a screen of the display device 910, a keypad, a keyboard, a button, or a switch, and receives an operation or information inputted from a user. The display device 910 includes a screen (such as a liquid crystal display (LCD) and an organic light-emitting diode (OLED) display), and displays an output image of the smartphone 900. The speaker 911 converts audio signals that are outputted from the smartphone 900 to sounds.

The radio communication interface 912 supports any cellular communication scheme (such as LTE and LTE-advanced), and performs a wireless communication. The radio communication interface 912 may include, for example, a BB processor 913 and an RF circuit 914. The BB processor 913 may perform, for example, encoding/decoding, modulating/demodulating, and multiplexing/de-multiplexing, and perform various types of signal processing for wireless communication. The RF circuit 914 may include, for example, a mixer, a filter and an amplifier, and transmits and receives wireless signals via the antenna 916. It should be noted that although FIG. 13 shows a case that one RF link is connected to one antenna, which is only illustrative, and a case that one RF link is connected to multiple antennas through multiple phase shifters may also exist. The radio communication interface 912 may be a chip module having the BB processor 913 and the RF circuit 914 integrated thereon. The radio communication interface 912 may include multiple BB processors 913 and multiple RF circuits 914, as shown in FIG. 13. Although FIG. 13 shows the example in which the radio communication interface 912 includes the multiple BB processors 913 and the multiple RF circuits 914, the radio communication interface 912 may also include a single BB processor 913 or a single RF circuit 914.

Furthermore, in addition to a cellular communication scheme, the radio communication interface 912 may support another type of wireless communication scheme such as a short-distance wireless communication scheme, a near field communication scheme, and a radio local area network (LAN) scheme. In this case, the radio communication interface 912 may include the BB processor 913 and the RF circuit 914 for each wireless communication scheme.

Each of the antenna switches 915 switches connection destinations of the antennas 916 among multiple circuits (such as circuits for different wireless communication schemes) included in the radio communication interface 912.

Each of the antennas 916 includes a single or multiple antenna elements (such as multiple antenna elements included in an MIMO antenna) and is used for the radio communication interface 912 to transmit and receive wireless signals. The smartphone 900 may include the multiple antennas 916, as shown in FIG. 13. Although FIG. 13 shows the example in which the smartphone 900 includes the multiple antennas 916, the smartphone 900 may also include a single antenna 916.

Furthermore, the smartphone 900 may include the antenna 916 for each wireless communication scheme. In this case, the antenna switches 915 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the radio communication interface 912, and the auxiliary controller 919 to each other. The battery 918 supplies power to blocks of the smart phone 900 shown in FIG. 13 via feeder lines that are partially shown as dashed lines in FIG. 13. The auxiliary controller 919, operates a minimum necessary function of the smart phone 900, for example, in a sleep mode.

In the smartphone 900 shown in FIG. 13, a transceiver of the electronic apparatus 100 may be implemented by the radio communication interface 912. At least a part of functions may also be implemented by the processor 901 or the auxiliary controller 919. For example, the processor 901 or the auxiliary controller 919 may re-determine the PL RS for the first aperiodic SRS resource whose beam emitting direction is updated by the MAC CE signaling by performing functions of the first determining unit 101 and the second determining unit 102.

Second Application Example

Figure 14:
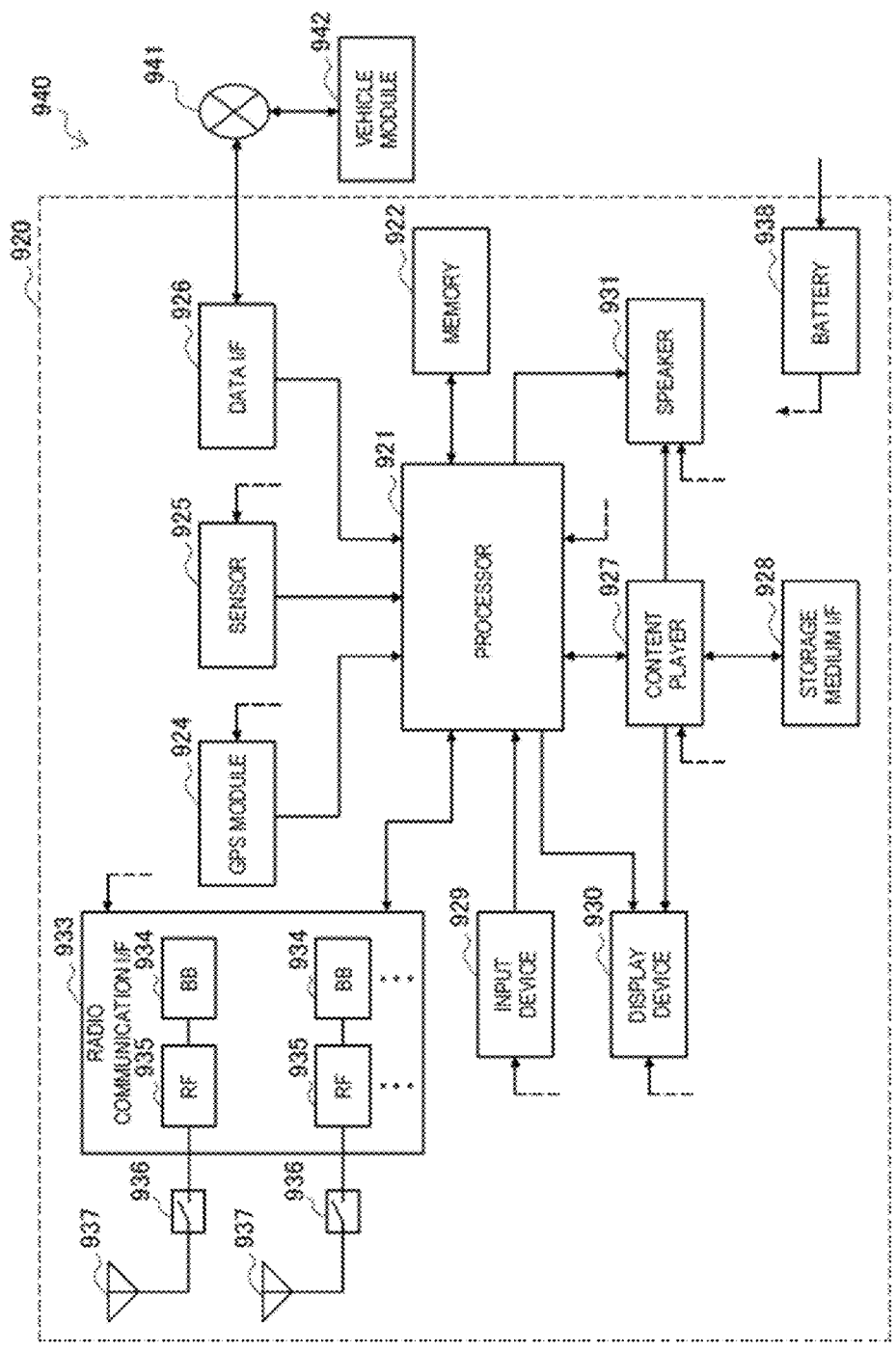
FIG. 14 is a block diagram showing an example of an exemplary configuration of a car navigation apparatus to which the technology according to the present disclosure may be applied.

FIG. 14 is a block diagram showing an example of a schematic configuration of a car navigation apparatus 920 to which the technology according to the present disclosure may be applied. The car navigation apparatus 920 includes a processor 921, a memory 922, a global positioning system (GPS) module 924, a sensor 925, a data interface 926, a content player 927, a storage medium interface 928, an input device 929, a display device 930, a speaker 931, a radio communication interface 933, one or more antenna switches 936, one or more antennas 937, and a battery 938.

The processor 921 may be, for example a CPU or a SoC, and controls a navigation function and additional function of the car navigation apparatus 920. The memory 922 includes RAM and ROM, and stores a program that is executed by the processor 921, and data.

The GPS module 924 determines a position (such as latitude, longitude and altitude) of the car navigation apparatus 920 by using GPS signals received from a GPS satellite. The sensor 925 may include a group of sensors such as a gyro sensor, a geomagnetic sensor and an air pressure sensor. The data interface 926 is connected to, for example, an in-vehicle network 941 via a terminal that is not shown, and acquires data (such as vehicle speed data) generated by the vehicle.

The content player 927 reproduces content stored in a storage medium (such as a CD and a DVD) that is inserted into the storage medium interface 928. The input device 929 includes, for example, a touch sensor configured to detect touch onto a screen of the display device 930, a button, or a switch, and receives an operation or information inputted from a user. The display device 930 includes a screen such as an LCD or OLED display, and displays an image of the navigation function or content that is reproduced. The speaker 931 outputs a sound for the navigation function or the content that is reproduced.

The radio communication interface 933 supports any cellular communication scheme (such as LTE and LTE-Advanced), and performs wireless communication. The radio communication interface 933 may typically include, for example, a BB processor 934 and an RF circuit 935. The BB processor 934 may perform, for example, encoding/decoding, modulating/demodulating and multiplexing/de-multiplexing, and perform various types of signal processing for wireless communication. The RF circuit 935 may include, for example, a mixer, a filter and an amplifier, and transmits and receives wireless signals via the antenna 937. The radio communication interface 933 may also be a chip module having the BB processor 934 and the RF circuit 935 integrated thereon. The radio communication interface 933 may include multiple BB processors 934 and multiple RF circuits 935, as shown in FIG. 14. Although FIG. 14 shows the example in which the radio communication interface 933 includes the multiple BB processors 934 and the multiple RF circuits 935, the radio communication interface 933 may also include a single BB processor 934 and a single RF circuit 935.

Furthermore, in addition to a cellular communication scheme, the radio communication interface 933 may support another type of wireless communication scheme such as a short-distance wireless communication scheme, a near field communication scheme, and a wireless LAN scheme. In this case, the radio communication interface 933 may include the BB processor 934 and the RF circuit 935 for each wireless communication scheme.

Each of the antenna switches 936 switches connection destinations of the antennas 937 among multiple circuits (such as circuits for different wireless communication schemes) included in the radio communication interface 933.

Each of the antennas 937 includes a single or multiple antenna elements (such as multiple antenna elements included in an MIMO antenna), and is used by the radio communication interface 933 to transmit and receive wireless signals. As shown in FIG. 14, the car navigation apparatus 920 may include the multiple antennas 937. Although FIG. 14 shows the example in which the car navigation apparatus 920 includes the multiple antennas 937, the car navigation apparatus 920 may also include a single antenna 937.

Furthermore, the car navigation apparatus 920 may include the antenna 937 for each wireless communication scheme. In this case, the antenna switches 936 may be omitted from the configuration of the car navigation apparatus 920.

The battery 938 supplies power to the blocks of the car navigation apparatus 920 shown in FIG. 14 via feeder lines that are partially shown as dash lines in FIG. 14. The battery 938 accumulates power supplied from the vehicle.

In the car navigation apparatus 920 shown in FIG. 14, the electronic apparatus 100 may be implemented by the radio communication interface 933. At least a part of the functions may also be implemented by the processor 921. For example, the processor 921 may re-determine the PL RS for the first aperiodic SRS resource whose beam emitting direction is updated by the MAC CE signaling by performing functions of the first determining unit 101 and the second determining unit 102.

The technology of the present disclosure may also be implemented as an in-vehicle system (or a vehicle) 940 including one or more blocks of the car navigation apparatus 920, the in-vehicle network 941 and a vehicle module 942. The vehicle module 942 generates vehicle data (such as a vehicle speed, an engine speed, and failure information), and outputs the generated data to the in-vehicle network 941.

The basic principle of the present disclosure has been described above in conjunction with particular embodiments. However, as can be appreciated by those ordinarily skilled in the art, all or any of the steps or components of the method and apparatus according to the disclosure can be implemented with hardware, firmware, software or a combination thereof in any computing device (including a processor, a storage medium, etc.) or a network of computing devices by those ordinarily skilled in the art in light of the disclosure of the disclosure and making use of their general circuit designing knowledge or general programming skills.

Moreover, the present disclosure further discloses a program product in which machine-readable instruction codes are stored. The aforementioned methods according to the embodiments can be implemented when the instruction codes are read and executed by a machine.

Accordingly, a memory medium for carrying the program product in which machine-readable instruction codes are stored is also covered in the present disclosure. The memory medium includes but is not limited to soft disc, optical disc, magnetic optical disc, memory card, memory stick and the like.

In the case where the present disclosure is realized with software or firmware, a program constituting the software is installed in a computer with a dedicated hardware structure (e.g. the general computer 1400 shown in FIG. 14) from a storage medium or network, wherein the computer is capable of implementing various functions when installed with various programs.

Figure 15:
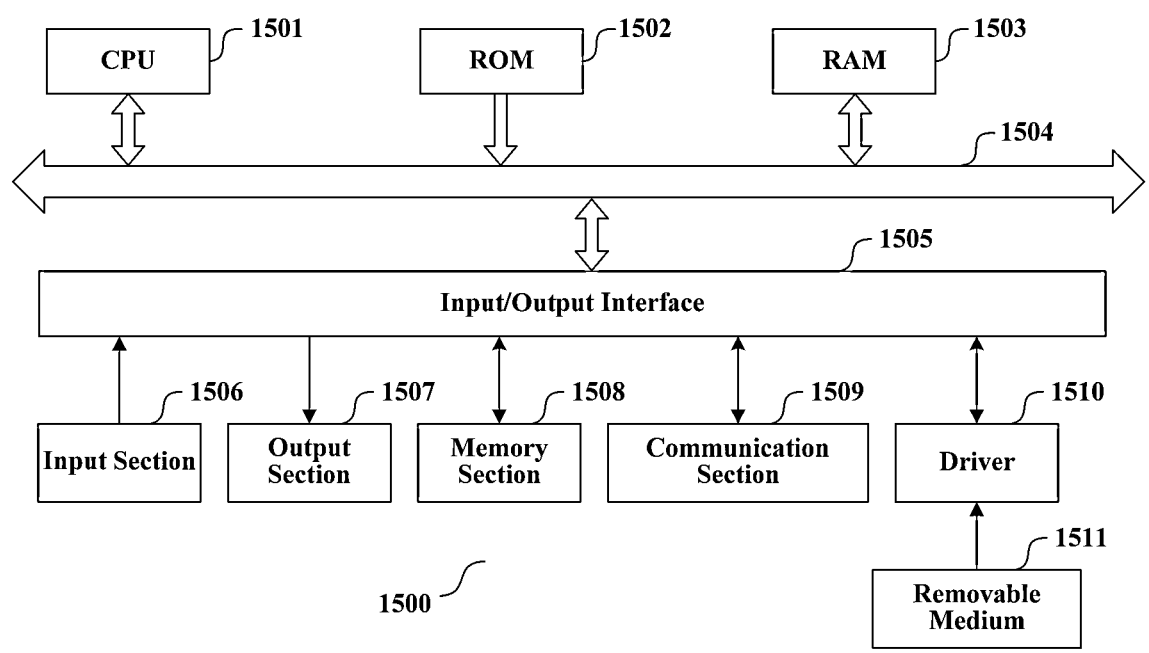
FIG. 15 is a block diagram of an exemplary block diagram illustrating the structure of a general purpose personal computer capable of realizing the method and/or device and/or system according to the embodiments of the present disclosure.

In FIG. 15, a central processing unit (CPU) 1501 executes various processing according to a program stored in a read-only memory (ROM) 1502 or a program loaded to a random access memory (RAM) 1503 from a memory section 1508. The data needed for the various processing of the CPU 1501 may be stored in the RAM 1503 as needed. The CPU 1501, the ROM 1502 and the RAM 1503 are linked with each other via a bus 1504. An input/output interface 1505 is also linked to the bus 1504.

The following components are linked to the input/output interface 1505: an input section 1506 (including keyboard, mouse and the like), an output section 1507 (including displays such as a cathode ray tube (CRT), a liquid crystal display (LCD), a loudspeaker and the like), a memory section 1508 (including hard disc and the like), and a communication section 1509 (including a network interface card such as a LAN card, modem and the like). The communication section 1509 performs communication processing via a network such as the Internet. A driver 1510 may also be linked to the input/output interface 1505, if needed. If needed, a removable medium 1511, for example, a magnetic disc, an optical disc, a magnetic optical disc, a semiconductor memory and the like, may be installed in the driver 1510, so that the computer program read therefrom is installed in the memory section 1508 as appropriate.

In the case where the foregoing series of processing is achieved through software, programs forming the software are installed from a network such as the Internet or a memory medium such as the removable medium 1511.

It should be appreciated by those skilled in the art that the memory medium is not limited to the removable medium 1511 shown in FIG. 15, which has program stored therein and is distributed separately from the apparatus so as to provide the programs to users. The removable medium 1511 may be, for example, a magnetic disc (including floppy disc (registered trademark)), a compact disc (including compact disc read-only memory (CD-ROM) and digital versatile disc (DVD), a magneto optical disc (including mini disc (MD) (registered trademark)), and a semiconductor memory. Alternatively, the memory medium may be the hard discs included in ROM 1502 and the memory section 1508 in which programs are stored, and can be distributed to users along with the device in which they are incorporated.

To be further noted, in the device, method and system according to the present disclosure, the respective components or steps can be decomposed and/or recombined. These decompositions and/or recombinations shall be regarded as equivalent solutions of the disclosure. Moreover, the above series of processing steps can naturally be performed temporally in the sequence as described above but will not be limited thereto, and some of the steps can be performed in parallel or independently from each other.

Finally, to be further noted, the term "include", "comprise" or any variant thereof is intended to encompass nonexclusive inclusion so that a process, method, article or device including a series of elements includes not only those elements but also other elements which have been not listed definitely or an element(s) inherent to the process, method, article or device. Moreover, the expression "comprising a(n) . . . " in which an element is defined will not preclude presence of an additional identical element(s) in a process, method, article or device comprising the defined element(s)" unless further defined.

Although the embodiments of the present disclosure have been described above in detail in connection with the drawings, it shall be appreciated that the embodiments as described above are merely illustrative rather than limitative of the present disclosure. Those skilled in the art can make various modifications and variations to the above embodiments without departing from the spirit and scope of the present disclosure. Therefore, the scope of the present disclosure is defined merely by the appended claims and their equivalents.

The invention claimed is:

1. An electronic apparatus for wireless communications, comprising:
   processing circuitry, configured to:
   determine a first aperiodic sounding reference signal (SRS) resource whose beam emitting direction is updated by a first medium access control-control element (MAC CE) signaling; and
   re-determine, based on information of the beam emitting direction of the first aperiodic SRS resource in the first MAC CE signaling or a second MAC CE signaling, a path loss reference signal for the first aperiodic SRS resource,
   wherein, the first aperiodic sounding reference signal resource belongs to a first sounding reference signal resource set and a first path loss reference signal for the first sounding reference signal resource set is on a first serving cell, the second MAC CE signaling is used for linking the first path loss reference signal to a second serving cell, and the processing circuitry is configured to determine the first path loss reference signal on the second serving cell as the path loss reference signal for the first aperiodic sounding reference signal resource, wherein, the first serving cell and the second serving cell are servings cells in carrier aggregation.

2. The electronic apparatus according to claim 1, wherein, the processing circuitry is configured to re-determine the path loss reference signal based on information of a downlink reference signal or an uplink reference signal comprised in the information of the beam emitting direction.

3. The electronic apparatus according to claim 2, wherein, in a case that the information of the downlink reference signal is comprised in the information of the beam emitting direction, the processing circuitry is configured to take the downlink reference signal as the path loss reference signal for the first aperiodic sounding reference signal resource.

4. The electronic apparatus according to claim 2, wherein, in a case that the information of the uplink reference signal is comprised in the information of the beam emitting direction, the processing circuitry is configured to take a path loss reference signal for a sounding reference signal resource set to which the uplink reference signal belongs as the path loss reference signal for the first aperiodic sounding reference signal resource.

5. The electronic apparatus according to claim 2, wherein, in a case that the information of the downlink reference signal is comprised in the information of the beam emitting direction, the processing circuitry is configured to take a synchronization signal block having a quasi co location TypeD (QCL_TypeD) relationship with the downlink reference signal as the path loss reference signal for the first aperiodic sounding reference signal resource.

6. The electronic apparatus according to claim 2, wherein, in a case that the information of the uplink reference signal is comprised in the information of the beam emitting direction, the processing circuitry is configured to take a synchronization signal block in a beam direction previously used for receiving the uplink reference signal as the path loss reference signal for the first aperiodic sounding reference signal resource.

7. The electronic apparatus according to claim 1, wherein, in a case that the path loss reference signal for the first sounding reference signal resource set to which the first aperiodic sounding reference signal resource belongs is a channel state information reference signal, the processing circuitry is further configured to acquire the second MAC CE signaling from the base station and update a transmission configuration indication of the path loss reference signal for the first sounding reference signal resource set based on the second MAC CE signaling.

8. The electronic apparatus according to claim 1, wherein, the second MAC CE signaling is used for transferring the first aperiodic sounding reference signal resource to a second sounding reference signal resource set which is different from the first sounding reference signal resource set, and the processing circuitry is configured to determine the path loss reference signal for the second sounding reference signal resource set as the path loss reference signal for the first aperiodic sounding reference signal resource.

9. The electronic apparatus according to claim 1, wherein, the processing circuitry is further configured to take the re-determined path loss reference signal for the first aperiodic sounding reference signal resource as the path loss reference signal for other aperiodic sounding reference signal resources in the first sounding reference signal resource set to which the first aperiodic sounding reference signal resource belongs.

10. The electronic apparatus according to claim 1, wherein, the processing circuitry is further configured to maintain the path loss reference signal for other aperiodic sounding reference signal resources in the first sounding reference signal resource set to which the first aperiodic sounding reference signal resource belongs unchanged.

11. The electronic apparatus according to claim 1, wherein, the processing circuitry is further configured to select the method for re-determining the path loss reference signal for the first aperiodic sounding reference signal resource according to a following priority order: determining based on the second MAC CE signaling; and determining based on the information of the beam emitting direction.

12. An electronic apparatus for wireless communications, comprising:
 processing circuitry, configured to:
  with respect to a first aperiodic sounding reference signal resource whose beam emitting direction is updated by a first medium access control-control element (MAC CE) signaling, determine a method for user equipment to re-determine a path loss reference signal for the first aperiodic sounding reference signal resource; and
  determine, based on the determined method, operations to be further performed,
 wherein,
  the first aperiodic sounding reference signal resource belongs to the first sounding reference signal resource set, a first path loss reference signal for the first sounding reference signal resource set is on a first serving cell, and the first path loss reference signal is suitable to serve as the path loss reference signal for the first aperiodic sounding reference signal resource when the first path loss reference signal is on a second serving cell, wherein the first serving cell and the second serving cell are serving cells in carrier aggregation,
  the determined method comprises: linking the first path loss reference signal to the second serving cell through the second MAC CE signaling, and
  the processing circuitry is configured to generate the second MAC CE signaling and transmits the second MAC CE signaling to the user equipment.

13. The electronic apparatus according to claim 12, wherein,
 the determined method comprises: re-determining, by the user equipment, the path loss reference signal based on information of a downlink reference signal or an uplink reference signal comprised in information of a beam emitting direction, and
 the processing circuitry is configured to determine that no further operation is to be performed based on the determined method.

14. The electronic apparatus according to claim 12, wherein,
 the path loss reference signal for the first sounding reference signal resource set to which the first aperiodic sounding reference signal resource belongs is a channel state information reference signal,
 the determined method comprises: updating a transmission configuration indication of the channel state information reference signal based on a second MAC CE signaling, so that the channel state information reference signal is suitable for serving as the path loss reference signal for the first aperiodic sounding reference signal resource, and
 the processing circuitry is configured to generate the second MAC CE signaling comprising the transmission configuration indication and transmits the second MAC CE signaling to the user equipment.

15. The electronic apparatus according to claim 12, wherein,
 a path loss reference signal for a second sounding reference signal resource set which is different from the first sounding reference signal resource set is suitable to serve as the path loss reference signal for the first aperiodic sounding reference signal resource,
 the determined method comprises: transferring the first aperiodic sounding reference signal resource to the second sounding reference signal resource set through the second MAC CE signaling, and the processing circuitry is configured to generate the second MAC CE signaling and transmits the second MAC CE signaling to the user equipment.

16. The electronic apparatus according to claim 12, wherein, the processing circuitry is configured to determine the method based on one or more of: the information of the beam emitting direction in the first MAC CE signaling, the path loss reference signal for each sounding reference signal resource set, and signaling overhead.

17. A method for wireless communications, comprising:
determining a first aperiodic sounding reference signal resource whose beam emitting direction is updated by a first medium access control-control element (MAC CE) signaling; and
re-determining, based on information of the beam emitting direction of the first aperiodic sounding reference signal resource in the first MAC CE signaling or a second MAC CE signaling, a path loss reference signal for the first aperiodic sounding reference signal resource, wherein, the first aperiodic sounding reference signal resource belongs to a first sounding reference signal resource set and a first path loss reference signal for the first sounding reference signal resource set is on a first serving cell, the second MAC CE signaling is used for linking the first path loss reference signal to a second serving cell, and the processing circuitry is configured to determine the first path loss reference signal on the second serving cell as the path loss reference signal for the first aperiodic sounding reference signal resource, wherein, the first serving cell and the second serving cell are servings cells in carrier aggregation.

* * * * *